Feb. 28, 1961 J. A. HINLICKY ET AL 2,973,330
HYDROFORMING CATALYST
Filed Dec. 23, 1957 3 Sheets-Sheet 1

John A. Hinlicky
Fred H. Kant    Inventors

By *H. N. Feyrer* Attorney

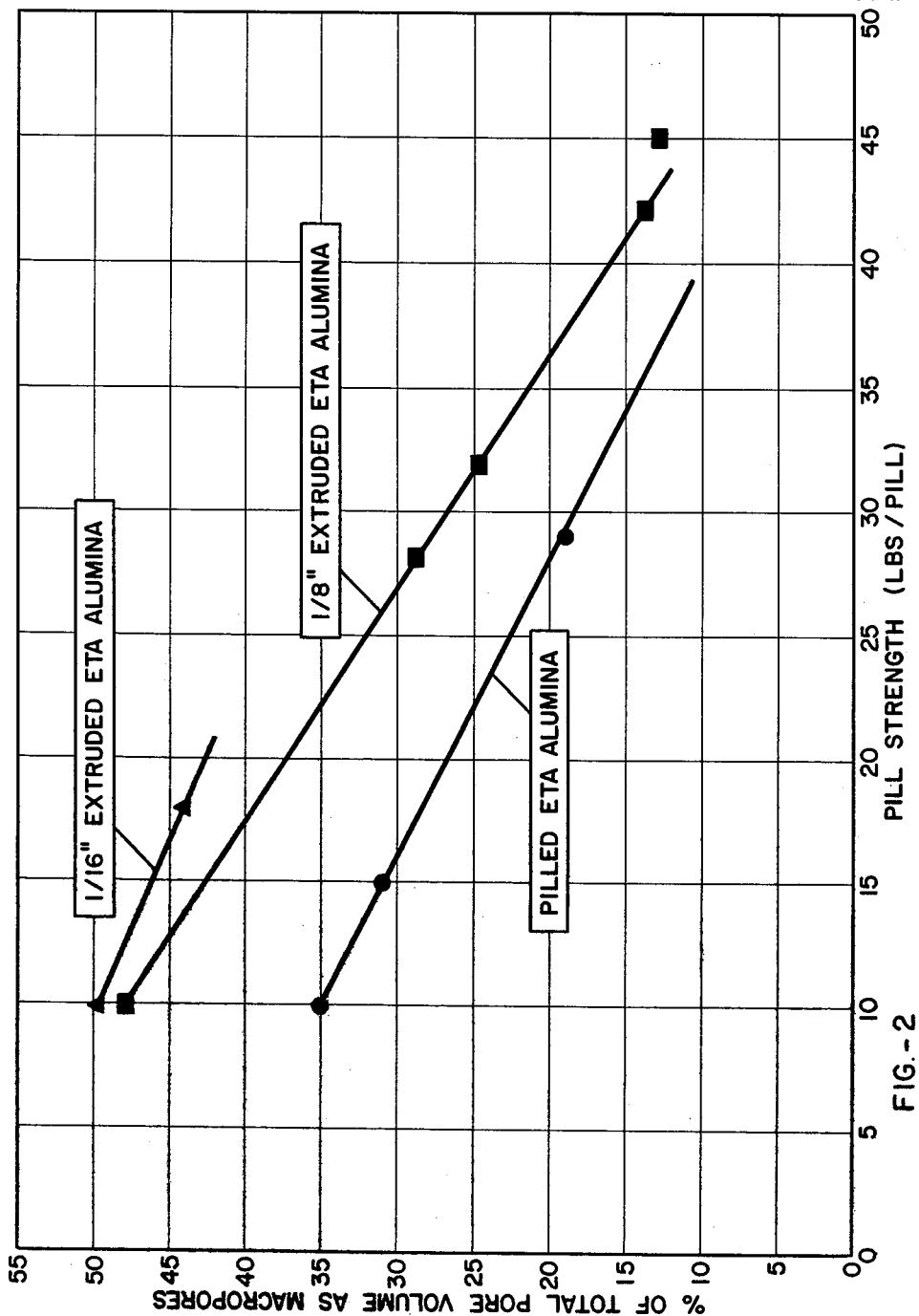

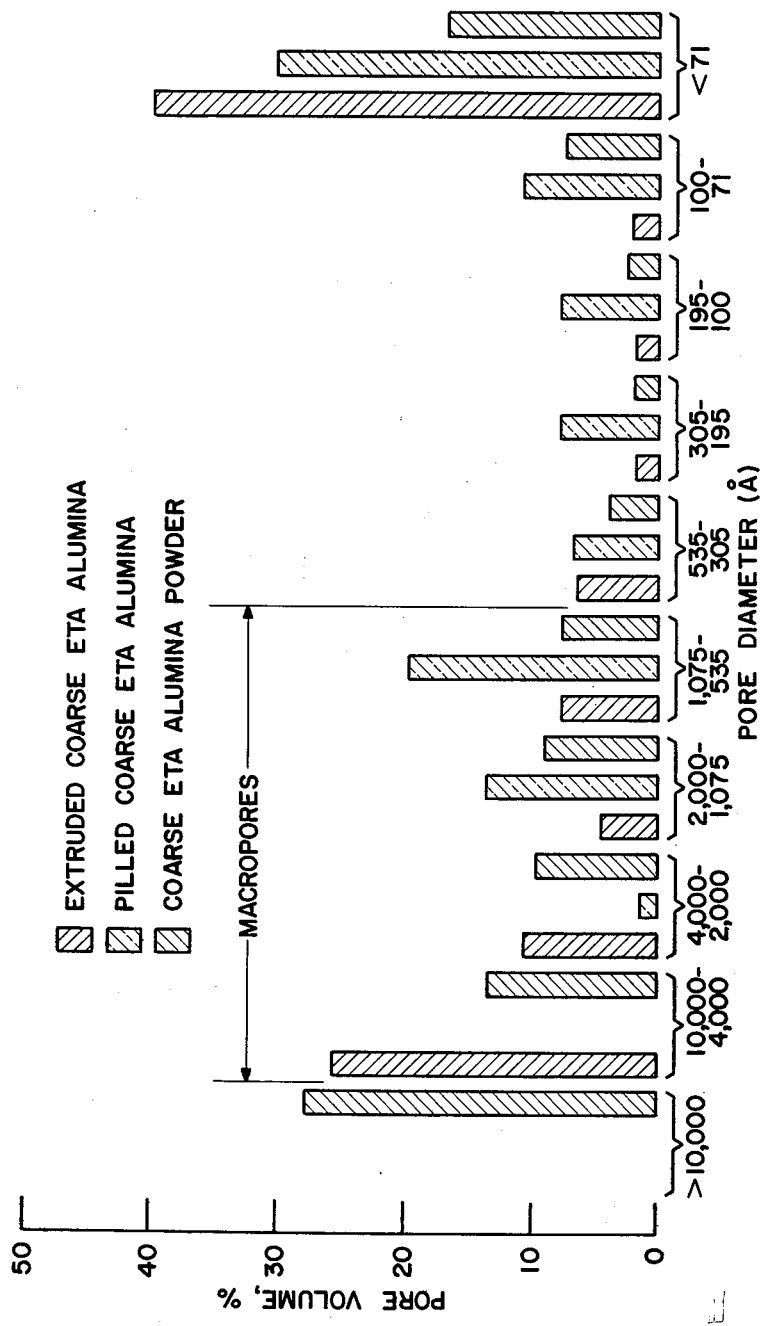

United States Patent Office 2,973,330
Patented Feb. 28, 1961

2,973,330

HYDROFORMING CATALYST

John A. Hinlicky, Irvington, and Fred H. Kant, Elizabeth, N.J., assignors to Esso Research and Engineering Company, a corporation of Delaware Filed Dec. 23, 1957, Ser. No. 704,652

20 Claims. (Cl. 252—466)

This invention relates to improved solid catalysts for the conversion of hydrocarbon materials. More particularly, it relates to improved platinum on alumina catalysts especially valuable in the hydroforming of fractions boiling in the motor gasoline boiling range. Most particularly, it relates to improved extruded platinum-alumina catalysts, the alumina of said catalysts containing more than about 50% eta alumina and the finished catalyst containing a large proportion of macropores.

Recently it has been determined that improved platinum hydroforming catalysts of high activity and activity maintenance are obtained by using an alumina which is more than about 50%, preferably about 80%, in the eta crystalline form.

These improved catalysts were prepared by methods which obtain a high eta alumina base for the final catalyst, preferably by hydrolyzing aluminum alcoholate and aging under conditions leading to the production of beta alumina trihydrate; drying and calcining the resultant beta alumina trihydrate to convert the hydrate to substantially anhydrous eta alumina; impregnating the eta alumina with chloroplatinic acid; and then forming the platinum-containing alumina into pills or pellets. The production of these catalysts has suffered from the disadvantages that platinum losses were relatively high due to the handling of platinum-containing powders, and the pilling operation was tedious and expensive to carry out.

It has now been found that improvements over these catalysts are obtained by treating beta alumina trihydrate or hydrous aluminas containing a major proportion of beta alumina trihydrate with certain mineral acids or their aluminum salts, extruding the resultant mixture, activating the extrudate to eta alumina by calcination and then impregnating the calcined extrudate with a compound of a platinum group (platinum, palladium, rhodium, osmium, iridium and ruthenium) metal, preferably chloroplatinic acid.

The catalyst so obtained is not only cheaper to make and involves less loss of platinum in the manufacturing operation but most importantly it is about 60% more active when used in regenerative type hydroforming than is pilled type eta alumina based catalyst and it gives about 2–3% higher yields of $C_5+$ material than does pilled type eta alumina based catalyst in both regenerative and non-regenerative operations. In addition, these extrudates exhibit superior particle strength and attrition resistance which is required for cyclic operation.

The present invention will be more clearly understood from the following detailed description of specific examples read in conjunction with the accompanying drawings of which:

Figure 2 is a correlation of mercury porosimeter data showing that increasing pellet strength decreases the percent of total pore volume as macropores.

Figure 3 is a bar graph showing a breakdown of the percent of total pore volume contained in pores of various size ranges from 1 to about 10,000 A. for extruded eta alumina, pilled eta alumina, and unpelleted coarse eta alumina powder.

Figure 1:
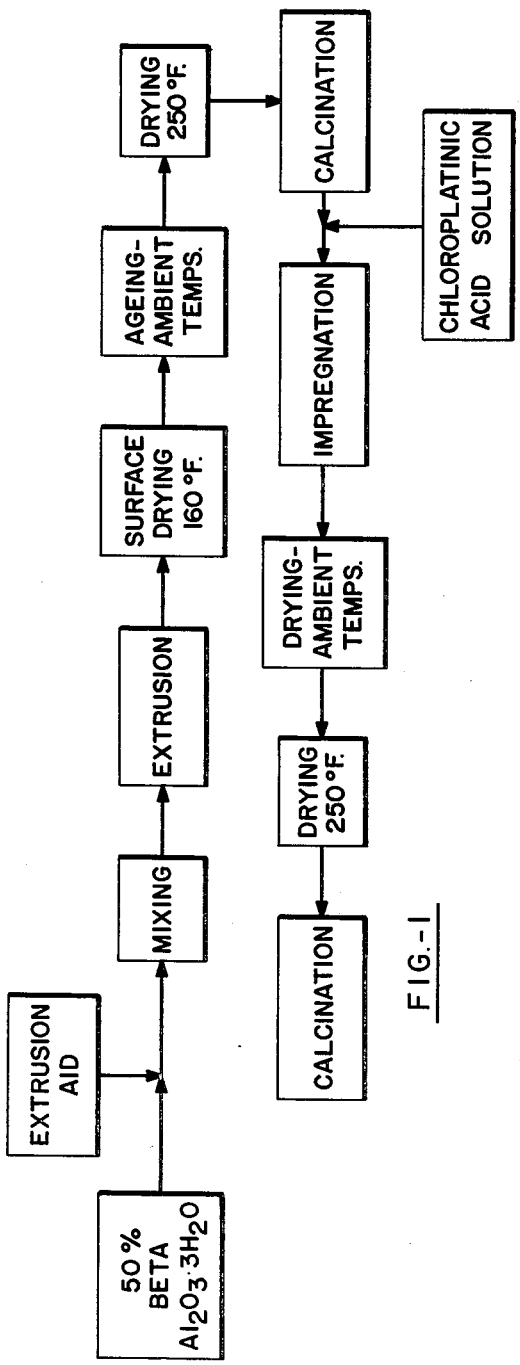
Figure 1 is a schematic flow diagram of the method of preparation of the highly active stable catalyst of the present invention.

The method of preparation of the highly active stable catalyst of the present invention is outlined in block form in accompanying Figure 1 which is self-explanatory.

The hydrous alumina used as the catalyst support in accordance with the present invention should contain more than 50% and is preferably substantially 100% beta alumina trihydrate. The alumina should be of very high purity as is obtainable, for example, by hydrolysis of aluminum alcoholate.

The more than 50% β alumina trihydrate starting material of the present invention may be prepared by the method outlined in U.S. Pat. No. 2,796,326. This process comprises reacting aluminum metal with a water insoluble anhydrous alcohol in a hydrocarbon solvent, hydrolyzing the solution of aluminum alcoholate obtained with agitation in preferably about 2–10 volumes of water per volume of aluminum alcoholate solution, preferably at 40–80° F., aging the hydrous alumina slurry which is contained in the water layer for about 20–65 hours at ambient temperature, and then drying at 200°–250° F.

Alternatively this more than 50% β alumina trihydrate may be prepared, with less aging time required, by hydrolyzing the aluminum alcoholate with aqueous $NH_3$ at 60–100° F. rather than with water. The $NH_3$ content of the hydrolyzing solution is preferably about 1.8–3.4 wt. percent and the amount used about 1–10 volumes per volume of alcoholate. With this process only ½ to 10 hours aging of the aqueous slurry at or below ambient temperatures is required, followed by drying to remove water and $NH_3$ to obtain the desired β alumina trihydrate. An alumina of large pore diameter can be prepared by hydrolyzing solutions of aluminum alcoholate in about 3.0% $NH_3$ solution at 150–175° F. with very vigorous agitation followed by aging for about 40–120 hours at about 60–70° F.

β alumina trihydrate containing alumina may also be prepared (1) by slowly adding aluminum chloride solutions to ammonium hydroxide solution in the cold followed by syneresis at room temperature, (2) by saturating a solution of sodium aluminate with carbon dioxide at room temperature, (3) by autoprecipitation from sodium aluminate solutions, and (4) by the action of water on amalgamated or finely divided aluminum at room temperature. Aluminas derived from sodium aluminate are less desirable than the previously described production from alcoholate alumina because of the impurities which usually are present in other starting materials and which detract from catalyst activity.

It is preferred to crush or size the β alumina trihydrate in such a way as to obtain a coarse size of particles to be used in the extrusion process. The coarse particle size contemplated by the present invention requires that not more than 5% be retained on a 10 mesh screen and less than 15% pass through a 100 mesh screen. This coarse alumina produces a considerably more active (in regenerative service) catalyst than is obtained when finer sized particles are used.

According to the present invention, to the dry β alumina trihydrate particles is added a suitable extrusion aid selected from the following: nitric acid, hydrochloric acid, mixtures of nitric and hydrochloric acids, mixtures of acetic acid with nitric acid, and aluminum nitrate or chloride solutions. The total amount of extrusion aid liquid to be added is determined by the particular extruder to be used and is constant within narrow limits for each extruder. The amount of acid or salt added (amount of 100% acid or salt) per wt. of $Al_2O_3$, however, is critical in order to obtain a very active, selective, and strong catalyst. These amounts are 3.5% to 25%, preferably 6% to 16% based on $Al_2O_3$. These ranges are the desired ranges regardless of the fact that different extruders require different amounts of liquid.

After the extrusion aid has been added, mixing is conducted only sufficiently to distribute the liquid (i.e. for 2 to 10 minutes) throughout the hydrous alumina particles and the material may then be extruded immediately. In the extrusion step the hydrous alumina particles moistened with the extrusion aid or plasticizer are subjected to significant mechanical pressure to extrude $1/16''$, $3/32''$ or $1/8''$ diameter rods or ribbons which are then sliced to form the desired lengths, for example $1/8''$ to $3/8''$. It is preferred to use minimum pressure in extrusion consonant with necessary strength so as to crush as few of the pores present in the material as possible during this step. Extrusion may be conducted in any of the well known commercial extruders available, such as the California Pellet Mill Company type extruder, or Sprout-Waldron type extruder, or Auger Mill extruder, or in laboratory extruders such as a piston and cylinder mounted in a Carver Press. The freshly formed extrudates are dried at a low temperature of below 212° F., and preferably below about 160° F. for a period of 30 minutes or less to remove surface water only, for handling purposes, and are then air-dried or aged at room temperature for 8 to 24 hours to remove water from the interior of the extrudates. This entire low temperature drying procedure is necessary to prevent the formation of steam from the moisture within the extrudates which would harm extrudate strength. Alternatively, any drying procedure carried out at below 212° F. conducted so as to prevent steam formation while removing about 90% of the free water is acceptable. Following aging, drying is continued at 250°–600° F., preferably about 250° F. for 1–24 hours whereupon the dried extrudates are calcined at 1000 to 1450° F. for a period of 1–24 hours to produce the desired high eta alumina catalyst supports.

The high strength, high eta alumina extrudates are then impregnated with a compound of a platinum group metal, preferably chloroplatinic acid. The platinum (or palladium) may be added to the alumina extrudates in any desired manner, provided that the compound used is in solution or in very fine colloidal suspension or in gaseous form. For example, a very dilute impregnating solution (containing about four grams of platinum per liter) may be prepared from chloroplatinic acid, ammonium chloroplatinate, platinum disulfide, ammonium platino nitrate, or di-nitrito di-amino platinum and used in an amount sufficient to cover the extrudates with the solution. Palladium catalysts may be prepared for example from palladium chloride or nitrate, or ammonium palladous chloride. The solution may be used by itself or in admixture with an added halide. The excess solution is then drained from the extruded pellets and the pellets spread out on plates to air dry. They are then heated at temperatures of about 250° F. and are finally calcined at about 1000–1150° F. to produce the present highly active and selective catalyst. Preferably the calcined catalyst is stored in sealed containers until it is ready to be used in the reactor. However, it may be reduced by such agents as hydrogen, hydrazine, or hydrogen sulfide and stored. In any case the catalyst is reduced with hydrogen in the reactor prior to use in any conversion process using hydrogen. For this catalyst the platinum or palladium compound should be added to the alumina in sufficient amount that the final catalyst contains from 0.01 to 2 or even 4 or more wt. percent of platinum or palladium, preferably, from 0.1 to 2 wt. percent of platinum or from 0.5 to 3 wt. percent of palladium.

It is also contemplated that the platinum or palladium may be composited with the $\beta$ alumina trihydrate before extrusion. Further it is contemplated that platinum or palladium may be incorporated on only part of the $\beta$ alumina trihydrate particles and a mixture of impregnated and unimpregnated $\beta$ trihydrate can be extruded and can be used as the catalyst. However, chances of contamination, when extruding with platinum or palladium present, and platinum losses due to increased handling of this precious material are increased.

In addition, development of pore structure by calcination prior to impregnation with platinum gives superior catalysts. It is also contemplated therefore that calcined eta alumina particles can be impregnated with platinum group metals and these can be comingled with unimpregnated alumina trihydrate particles and the mixture extruded to give a "diluted" catalyst. In all preparations of diluted catalysts it is contemplated that the impregnated and unimpregnated material may be of different particle size ranges. For example "coarse" (as previously defined) particles which have been impregnated with platinum compounds can be comingled with unimpregnated finer mesh particles. Diluted catalysts appear to be particularly advantageous with higher sulfur containing hydroforming feeds.

This catalyst is useful in regenerative operations. It is also especially useful in regenerative operations which include chlorine-treating as part of the regenerative cycle. In this respect fresh catalyst already is normally found to contain 0.3–0.6% chloride by analysis from the chloroplatinic acid used for impregnation of the catalyst (and additional amounts would be added in the preparation of extruded catalysts if halogen containing extrusion aids are used and are not washed out of the extrudate), but regardless of the origin of the original chlorine of the catalyst, it is desirable to include a chlorine treating step as part of the regenerative cycle. This is because some sintering of the platinum occurs during regeneration especially at high temperatures. This chlorine treating procedure involves treating the catalyst with about 2 wt. percent based on catalyst of chlorine by treating with a 1% chlorine in air mixture at about 800–1000° F. This treatment not only redistributes the platinum thereby increasing activity but also saturates the alumina with chlorine so that the chlorine treated catalyst analyzes 1–1.5% chloride on the catalyst. This level of chloride increases activity and also slightly increases hydrocracking. However, this hydrocracking is small enough so that the increased activity observed more than compensates economically for this effect. After extensive operations involving repeated regenerations, surface area declines and hence chlorine uptake during cyclic chlorine treating also declines. Hence, chloride on the catalyst in the latter stages of the said catalyst life analyzes about 0.6–1.0 wt. percent.

A short test suitable for laboratory evaluation of catalyst under regenerative operations involves heating the catalyst for 48 hours at 1400° F. This causes the surface area of fresh catalyst to decline from about 175–200 $M^2$/gm. to about 100–125 $M^2$/gm. which are the same values observed in commercial operation. In addition it has been found that a catalyst aged in this manner gives the same activity as a catalyst actually used in regenerative operations during the latter stages of its life at which time its surface areas is in the range of 100–125 $M^2$/gm.

The present invention will be clarified and defined from a consideration of the following examples:

*Example I*

A solution of aluminum amylate in a petroleum distillate prepared as per Example 4 of U.S. Pat. 2,636,865 was hydrolyzed by vigorously stirring the same into twice its volume of dilute ammonium hydroxide solution containing about 2.8 wt. percent NH₃ at about 80° F. After aging the resultant slurry of hydrous alumina for about 9 hours to convert the hydrous alumina product principally to beta alumina trihydrate a portion of the slurry was spray dried to form finely-divided particles of beta alumina trihydrate. The remainder of the slurry was dewatered and the alumina oven dried at 250° F. for 16 hours. The resultant dried product was then ground to form separate portions of a standard ground alumina somewhat coarser than that obtained by spray drying and a coarse ground alumina. Screen analyses of these betal alumina trihydrate samples are set out in Table I.

TABLE I

| Screen Size | Coarse | Standard | Fine-Spray Dried |
|---|---|---|---|
| On 20 | 38 | 5 | 0 |
| On 40 | 25 | 33 | 0-1 |
| On 60 | 13 | 12 | 0-1 |
| On 100 | 10 | 7 | 40 |
| On 180 | 10 | 29 | 37 |
| On 200 | 2 | 6 | 11 |
| Through 200 | 2 | 8 | 11 |

Each of these samples of β alumina trihydrate was mixed with 25 wt. percent based on the alumina of a solution containing 5 wt. percent of HCl on alumina and 3 wt. percent of HNO₃ on alumina and the acid-moistened, alumina trihydrate was extruded through a ³/₃₂" diameter hole size die in a California Pellet Mill Company extruder. The extrudate was cut into ⅜" lengths and the pellets were dried at 155° F. for 20 minutes, and then allowed to dry in air for 16 hours. The air dried extrudates were then calcined at 1100° F. for 4 hours to activate or render them adsorptive.

The total pore volume and the volume of macropores (volume of pores larger than 500 A. diameter) of each of the extrudates were determined by the method of Hg liquid penetration described in an article by H. L. Ritter and L. C. Drake appearing in Ind. & Eng. Chem. (Analytical Edition), vol. 17, page 782, December 1945.

The crushing strength of the extrudates was then measured by determining the pressure required to crush a single specimen placed lengthwise under a beam to which weights were added. The results of these tests are summarized in Table II below:

TABLE II

| Alumina | Pore Vol., cc./gm. Total | Pore Volume, cc./gm. Macropores | Extrudate Side Crushing Strength, Fresh, lbs. |
|---|---|---|---|
| Fine (Spray Dried) | .38 | .125 | 21 |
| Standard (Ground) | .40 | .105 | 21 |
| Coarse (Ground) | .38 | .110 | 20 |

It was thus determined that there was no effect of the coarseness of the β alumina trihydrate particles upon the physical properties of total pore volume, volume of macropores, and strength of the extrudates.

Each of the samples of extrudates was impregnated with 0.3 wt. percent of platinum by mixing the extrudates with enough of a very dilute solution of chloroplatinic acid to cover the extrudates. The solution contained 3 grams of platinum per liter. After maintaining the extrudates in contact with the solution for about 16 hours the excess solution was drained off and the impregnated extrudates were air dried for 1 day, heated to dryness at 250° F. and finally calcined at 1100° F. for 1 hour to activate the same. Each sample of catalyst was tested for regenerative hydroforming activity by heat aging the sample 48 hours at 1400° F. in a furnace and then using the same as the catalyst for hydroforming in a test unit.

The same feed stock and constant conditions of temperature, pressure, feed rate, and recycle gas rate were used with each catalyst tested as follows:

Feed stock—200/330° F. virgin naphtha obtained from mixed sweet Louisiana crudes.
Feed rate—6 wt. of feed stock/hr./wt. of catalyst
Sand bath temperature—940° F.
Pressure—200 p.s.i.g.
Hydrogen rate—5000 s.c.f./b. of once-through H₂.
Catalyst charge—150 gms. of catalyst diluted with inert electricians beads to 500 cc.
Length of test—7 hours with product taken during hours 3-7.

At these constant conditions each catalyst sample produced a product having either a higher or a lower octane rating than was obtained with the standard catalyst (non Cl₂ treated, fresh, platinum pilled eta catalyst). Since octane level and feed rate are interrelated (i.e. with a more active catalyst one can utilize the advantage obtained either to increase feed rate or to obtain higher octane), these octane levels were then converted to relative activities.

Relative activity $$= \frac{\text{w./hr./w. feed rate catalyst in question} \times 100}{\text{w./hr./w. feed rate standard catalyst}}$$

The activity ratings for the catalysts tested were obtained from their respective octane levels at the standard feed rate by the following conventional method. Experimental data were collected on the feed rates required with the standard catalyst to obtain different octane levels. The w./hr./w. required to obtain 96.6 octane level with the standard catalyst was given a rating of 100 and activities for octanes below and above this 96.6 value were determined from the feed rates required to obtain these octanes. Thus from this plot of activity vs. octane number for the standard catalyst relative activities of the other catalysts were determined from the octane levels obtained with these catalysts in the laboratory reactor under standard conditions.

The advantage of relative activity ratings as compared to octane levels is that, for the former, one can determine directly the information most usually desired, i.e. for example if the catalyst has an activity of 200 one need use only one-half as much of this catalyst as is needed of a catalyst having an activity of 100 to obtain the same product.

Throughout the description of the present invention all catalysts except the standard catalyst were given a standard 2 wt. percent chlorine treatment as described previously. Thus all relative activities are comparable being obtained as above using the same reference standard catalyst.

The activities obtained using the different size β alumina trihydrate particles are set out in Table III.

TABLE III

| | | | Heat Aged Activity |
|---|---|---|---|
| 8% HCl—HNO₃ Extrusion. | Coarse Particles | .3% Pt | 130 |
| | Standard Particles | .3% Pt | 105-115 |
| | Fine Particles | .3% Pt | 92 |

It is thus apparent that the use of a coarse size of particle produces a catalyst considerably superior to the catalysts obtained using finer sized particles.

The coarse particles, as contemplated in this invention are preferably obtained by grinding an alumina cake which is obtained by slow, oven drying (250° F.) of a hydrous alumina slurry. More rapid drying of this slurry such as for instance (a) by spray drying or (b) by centrifuging the slurry followed by drying, gives rise to undesirably fine powders. In addition to the preferred particles must have sufficient strength to withstand powdering during the extrusion step.

It has also been determined that this effect of powder particle size upon activity was not encountered in pilled eta alumina catalyst probably because of powdering of the particles (i.e. the variances in results obtained were within experimental error when tested on a fresh catalyst containing 0.3% Pt and 0.3% Cl). It has also been found that extrudates made with coarser alumina have lower bulk density than finer aluminas extruded under the same conditions. This effect, therefore, of alumina particle size may be most important in cases where the catalyst is more porous, i.e. extrudates, in regenerative operations, and on higher cracking activity bases (i.e. those containing Cl or $SiO_2$).

Considering also the results reported in Table II this activity advantage is probably associated with the way platinum disperses on the formed extrudate, since the pore structure of the extruded eta aluminas prepared using beta trihydrate particles of different coarseness is approximately the same.

*Example II*

A variety of acids and salts were tested as plasticizers or agents for rendering the beta alumina trihydrate extrudable into extrudates of adequate strength and activity characteristics. Tests to determine side crushing strength of the various extrudates and relative activity were then conducted.

It was found as reported in Table IV following that suitable extrusion aids are nitric acid, hydrochloric acid, mixtures of acetic acid with nitric acid, and aluminum salts of nitric acid or halogen acids, such halogen acid being preferably hydrochloric acid. It was in addition found, also reported in Table IV following, that certain other possible extrusion aids were undesirable either because the extrusion aids adversely affected the activity of the catalyst because of deposits left within the catalyst base or because they did not succeed in imparting sufficient strength to the extrudates. In this table and throughout the description of the present invention activities are reported either as fresh or heat aged. The latter has already been defined, and "fresh" refers only to the fact that the catalysts have not been heat aged. Obviously, "fresh" activities are usually considerably above "heat aged" activities. The latter treat in fact, as discussed later gives a very close approximation to activities which actually would be obtained under regenerative operations by testing said catalyst at a latter stage in its total life.

TABLE IV

| Extrusion Aid | | Side Crushing [1] Strength, Lbs. | Fresh [1] Relative Activity |
|---|---|---|---|
| $HNO_3$ | 16% | 23 | 174 |
| HCl | 8% | 20 | |
| $HCl:HNO_3$ 7:4 | 16% | 11 | 174 |
| $HC_2H_3O_2:HNO_3$ 1:1 | 16% | 23 | 174 |
| $Al(NO_3)_3.9H_2O$ | 6% as $HNO_3$ | 32 | [2] 92 |
| $AlCl_3.6H_2O$ | 8% as HCl | 15 | [2] 131 |
| $H_3PO_4$ | 6% | 23 | 102 (low) |
| $HC_2H_3O_2$ | 15% | 5 | 89 (low) |
| Boric Acid | 2% | 4 | |
| $H_2O$ | 25% | 3 | |
| $NH_4Cl$ | 8% | 3 | |
| $NH_4NO_3$ | 8% | 3 | |
| $H_2SO_4$ | Sulfate Contaminated-Extrudate would not pick up Pt readily. | | |

[1] A suitable extrusion aid gives about 175 relative activity fresh and a side crushing strength of at least 10-25 lbs.
[2] Heat aged activities. Heat aged commercial pilled type eta alumina has relative activity of 80.

It is postulated that the extrusion aids which were found desirable avoid the strength and activity disadvantages of those described in Table IV and undesirable as follows:

Nitric and halogen acids as well as mixtures of these acids are suitable or superior because the nitrate decomposes leaving aluminum oxide which does not harm activity and the halogen is desirable on the catalyst or can easily be removed by water washing. This is also true of the aluminum salts of these acids. Acetic acid in combination with nitric acid is suitable because the nitric acid removes the carbon formed by the decomposition of the acetate. With respect to this latter combination of acids, the combination is particularly desirable in that corrosion problems may be alleviated by substituting for part of the corrosive nitric acid the less corrosive acetic acid.

It is known in the art that with respect to the amount of extrusion aid liquid to be added and the concentration of that liquid the former is fixed within narrow limits by the particular commercial extruder to be used. Thus, if the amount of liquid per weight of powder is varied more than about 2% in either direction a continuous extrudate does not result. It has now been determined that varying the amount of liquid added within this narrow range does not significantly improve or degrade the catalyst obtained either as to activity or as to the strength of the pellet produced. Thus, with a California Pellet Mill when 22.5% of water was added to a constant amount of acid for use in extruding the catalyst described in Example I a heat aged activity of 115 was obtained and when 25% of water was used an activity of 105 was obtained. These variances are within experimental error. In both cases the catalysts were of suitable strength. It is therefore preferred not to attempt to control the total amount of liquid added to the powder within the limits set by the particular extruder used.

It has also been found that a Carver Laboratory Press extruder which uses twice the amount of liquid used in the commercial California Pellet Mill or the Auger Mill also produces a catalyst (prepared otherwise as in Example 1) which has the same activity as that produced by the commercial extruders. It is therefore contemplated that most commercial extruders regardless of the total liquid required on the powder can be advantageously used in this invention.

Since the total amount of liquid to be added is set within narrow limits the amount of the extrusion aid added can best be described in terms of the remaining variable i.e. the amount of 100% acid or 100% aluminum salt added to the alumina. The amount of extrusion aid is expressed as weight percent based on alumina and is computed on $Al_2O_3$ and not on $Al_2O_3.3H_2O$.

*Example III*

Catalysts were prepared by the procedure described in Example I except that different amounts of $HCl:HNO_3$ (used in the same 7:4 mol ratio of the former to the latter as in Example I) were added to "standard" alumina. Tests were also made and are reported using different amounts of $HNO_3$ (basis wt. 100% $HNO_3$/wt. $Al_2O_3$). These results are reported in Table V.

TABLE V

| Acid | Amount of Acid Added, Weight percent on $Al_2O_3$ | Side Crushing Strength, Fresh, lbs. |
|---|---|---|
| $HCl:HNO_3(7:4)$ | 2 | 6.5 |
| $HCl:HNO_3(7:4)$ | 4 | 14.5 |
| $HCl:HNO_3(7:4)$ | 8 | 21.0 |
| $HNO_3$ | 3-½ | 7 |
| $HNO_3$ | 14 | 30 |

Thus it is seen that the strength of the extrudate is increased by increasing the amount of 100% extrusion aid (weight percent based on $Al_2O_3$) added to the alumina particle. For a suitable fixed bed catalyst, extrudate side crushing strength fresh (i.e. before use) should be at least 10-25 lbs. It is therefore preferred and necessary that the amount of acid added must be above about 3.5% for suitable strength for fixed bed use, and, of course, higher strengths are desired, particularly for moving bed use.

Although relatively high acid concentrations are required as an extrusion aid most of this acid is removed by calcination. In the case of using up to 16% HCl:HNO₃ in a 7:4 ratio as extrusion aid, the residual chloride content (without stripping) of the base after calcination is only .6 wt. percent. This is roughly half the chlorine capacity of the alumina base.

Acid extrusion has little effect on alumina type. In the case of extruding essentially 100% β alumina trihydrate, X-ray diffraction patterns indicate that the extrudate is essentially pure β alumina trihydrate before calcination and eta alumina after calcination.

It has been found, also, that impregnating the calcined extruded base with chloroplatinic acid in water solution does not materially alter the side crushing strength. This is a marked difference from pilled alumina and indicates that these extruded particles are more resistant to degradation due to the action of water. Better particle strength maintenance should therefore be expected under regenerative conditions in operating units.

The HNO₃ extruded catalysts described in Table V were also tested for activity in hydroforming by the procedure described in Example I.

TABLE VI

| Amount of Extrusion Aid Added, Wt. Percent on Al₂O₃ | Heat Aged Relative Activity |
| --- | --- |
| 3.5% HNO₃* | 80 |
| 14.0% HNO₃* | 124 |

* 1/16" Auger mill extrudates.

It is thus seen that as the amount of acid increased the activity of the final catalyst increased greatly. It is therefore preferred to add more than 3.5 wt. percent of extrusion aid to the alumina powder so as to obtain as active a catalyst as possible and at the same time as shown above obtain extrudates of great strength. There is apparently no effect on activity by increasing the acid above 14% as shown in Table VII. However, it is preferred from a corrosion standpoint to use the minimum amount of acid consistent with the extrudate strength desired.

TABLE VII

| Amount of Extrusion Aid Added, Wt. Percent on Al₂O₃ | Heat Aged Relative Activity |
| --- | --- |
| 14.0% HNO₃* | 100 |
| 19.5% HNO₃* | 99 |
| 25.0% HNO₃* | 107 |

* 1/16" California pellet mill extrudates.

With reference to pelletizing material, whether by pilling or extrusion, it is preferred to use low pressures although these produce weaker pellets because increasing pressures cause a loss of macropores in the catalyst as shown in Fig. 2. Macropores are defined as pores having a size in the range of 0.05-1.0 microns.

In Figure 2 correlated data of pellet strength vs. percent of total pore volume as macropores were obtained using a mercury porosimeter.

It should be noted that throughout this description of the present invention pore volume is taken to mean the total volume determined by using both mercury porosimeter measurements and nitrogen adsorption measurements. Micropore volume is determined by the latter and macropore volume by the former with some overlapping and total pore volume is determined by adding micropore volume to macropore volume.

Thus, various pellets of different side crushing strengths were examined for pore structure with a mercury porosimeter and a correlation was found between side crushing strength and percent of macropores. The increased strength for the extrudates tested was obtained both by increasing extrusion pressure on a given extruder and by increasing the amount of extrusion aid added. Therefore this Figure 2 indicates that extrudate strengths should be controlled so that the minimum value necessary for commercial operations is obtained thus preserving the maximum number of macropores in said extrudate. This is because it is postulated that these macropores are largely responsible for good catalyst activity and selectivity and therefore it is preferred that their loss should be minimized. This is further discussed in following paragraphs. However, since the plot also generally implies that the percent of macropores present decreases with increasing pressure, it is preferred to increase strength by increasing the amount of extrusion aid at least to the level which gives maximum activity as shown in Tables VI and VII before increasing extrusion pressures as a route to greater extrudate strength.

*Example IV*

The improved catalyst of the present invention prepared except as to the amount of and type of extrusion aid and the pellet sizes as in Example I and all prepared from "coarse" alumina were tested and compared with the best previously known platinum hydroforming catalyst. This catalyst was a pilled catalyst prepared from substantially 100% eta alumina derived from aluminum alcoholate.

The results obtained are reported in Table VIII.

TABLE VIII

| Extrusion Aid | Percent | Relative Activity | | Side Crushing Strength | Size of Pellet, Dia. Length | Percent Pt |
| --- | --- | --- | --- | --- | --- | --- |
| | | Fresh | Heat Aged | | | |
| Pilled eta not extruded | | 140 | 80 | 25 | 3/16" x 3/32" | 0.6 or 0.3 |
| HNO₃ | 14 | ¹175 | 135 | 25 | 3/32" x 5/16" | 0.3 |
| HCl:HNO₃ 7:4 | 8 | ¹175 | 130 | 20 | 3/32" x 5/16" | 0.3 |
| HNO₃:HC₂H₃O₂ 1:1 | 16 | ¹175 | | 23 | | |
| HNO₃ | 14 | | 135 | 20 | 1/16" x 5/16" | 0.6 |

¹ These activity ratings were obtained where a laboratory Carver press extruder, 1/8" x 3/8" extrudates, was used.

Referring to Table VIII it can be seen that the catalyst of the present invention has a fresh activity slightly higher than that of a pilled type eta alumina based platinum catalyst. For further clarification the activity of 1/16" x 3/8" extrudate (prepared on a Laboratory Carver Press Extruder using 16% HNO₃ + HCl as extrusion aid) was compared with the pilled eta alumina catalyst. Both fresh catalyst were given a 2 wt. percent Cl₂ treat prior to testing. Initial activity data and inspections (after Cl₂ treating) are shown in Table IX.

TABLE IX

| Cat. | Surface Area M.²/gm. | Cl, wt. Percent | Relative Activity, Fresh |
|---|---|---|---|
| Extruded | 163 | 1.2 | 175 |
| Pilled | 197 | 1.3 | 145 |

As can be seen, this particular extruded catalyst had a lower surface area and lower Cl₂ uptake then the pilled catalyst; and yet its activity was still appreciably higher.

(It is normally expected, all other factors being constant, that increased surface area would increase chlorine uptake and the increased chloride level would increase activity.) In a longer cycle test with these catalysts it was additionally found that most of this activity advantage for the extruded catalyst was maintained throughout a 40 hour test period.

However, the greatest advantage of the extruded catalyst is that it suffers much less loss in activity during regeneration than does the pilled type eta alumina based catalyst. From Table VIII the heat aged activity of the extruded catalyst is about 60% greater than that of the pilled catalyst. This heat aged activity has been proven to be a very close approximation to the results which would be obtained in actual commercial regenerative operations. These activity results indicate that for regenerative hydroforming operations about two-thirds as much of the extruded catalyst would be required as would be required of the previously known and used pilled type eta alumina based catalyst.

Although the extruded catalysts of the present invention have different shapes than the prior art pilled pellets the activity advantages of the present catalyst cannot be attributed to these differences. A comparison of geometric surface area/volume ratios reveals little difference between the ³⁄₁₆" dia. x ³⁄₃₂" thick pill size and the ³⁄₃₂" dia. x ⁵⁄₁₆" length extrudate, the former being 43 and the latter 49. Additional evidence that within small size differences activity is not markedly affected by the size of pellet is seen from Table VII from the fact that where the surface area/volume is 70 with the smaller ¹⁄₁₆" x ⁵⁄₁₆" extrudates the activity is still only 135 as compared to 130–135 with the larger extrudates. It therefore can be seen that the Example IV activity values may be compared without regard to differences in the sizes of the extrudates. It should be noted, however, that is contemplated that various shapes of extruded particles can be used in this invention for reasons such as maximizing surface area to volume ratios.

Example V

The 8% HNO₃:HCl catalyst was also tested vs. the pilled type catalyst under conventional hydroforming conditions and on a 175/350° F. VT mixed Louisiana naphtha feed for selectivity to C₅+ components in the final product. These results are reported in Table X.

TABLE X

| Catalyst | Vol. percent C₅+ at 98 Octane [1] | |
|---|---|---|
| | Fresh | Heat Aged |
| Pilled eta (³⁄₁₆" x ³⁄₃₂") | 73.8 | 73.6 |
| 8% HNO³:HCl Extruded (¹⁄₁₆ x ⁵⁄₁₆") | 76.15 | 76.2 |

[1] Average 80-hour cycle yields (adiabatic operation).

Thus in addition to the activity advantage shown in Example IV, a 2–3 vol. percent C₅+ yield advantage is obtained with the present new catalyst. This yield advantage is of equal importance with the activity advantage particularly in the U.S. since a 1% increase in C₅+ yield is worth for each 20,000 bbl./day hydroformer in the order of one hundred thousand dollars per year.

It has been postulated that the large improvements in catalyst activity and yield obtained with the present catalyst are due to the fact that much less of the macro pores present in high eta alumina compounds prepared from beta alumina trihydrate are destroyed during extrusion with certain mineral acids or their aluminum salts than are lost in conventional pilling techniques. This is shown in accompanying Figure 3. Macropores are defined as those pores having a pore size in the range of 0.05–1.0 microns or 500 to 10,000 A. In Figure 3 data were obtained by mercury porosimeter and nitrogen adsorption measurements on an extrudate, a pill, and on unpelleted powder. The extrudate was made in a Carver Press using coarse powder and 16% HCl:HNO₃ in a 7:4 ratio, and was ¹⁄₁₆" x ⁵⁄₁₆" in size. The powder was the coarse eta alumina powder also previously described. As can be seen from Figure 3, the extruded material of the present invention contains not only a much larger percentage of macropores but also a much larger percentage of large macropores than does the pilled eta alumina.

Figure 4:
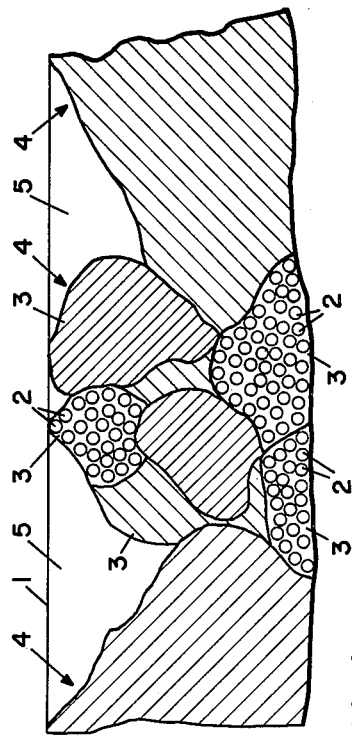
Figure 4 is a theoretical representation of a partial cross section of an extrudate taken perpendicular to the surface of said extrudate and showing the postulated different sized building blocks and aggregates of building block which make up the extrudate and which provide the different sized pores therein.

Recent catalyst theory further helps to explain the activity and selectivity advantages obtained with the present catalyst. Referring now to accompanying Fig. 4, a partial cross section of an extrudate taken perpendicular to the surface and showing the surface as line 1 is represented. This figure shows that the extrudate is made up of elementary crystallites 2, these ranging in size from 0–100 A. The interstices between these crystals are considered to be the micropore volume which we have previously described. The great part of the total surface area is the surface area of these crystallites. This is why the surface area as determined by nitrogen adsorption is close to the total surface area. Next in size are the aggregates 3 which are agglomerates of a number of the small crystallites. These range on the average from 500–10,000 A. The interstices between these aggregates is the macropore volume. Largest in size are the particles 4. These are agglomerates of aggregates. These can range in size from 1 micron to over 1000 microns. Lastly, the open spaces between these particles are the mechanical or super pores. Thus, the extrudate is composited particles of alumina and the surface roughness is a function of these mechanical or super pores. The desirability of maintaining macropores intact in the final catalyst material is that the catalyst thereby is not diffusion limited. It is postulated that the vaporous materials being reacted go into the catalyst through the mechanical or super pores, thence into the macropores, and thence to the micropores. In the micropores are the active catalyst centers, i.e. where the active metal is deposited on the alumina, or where defects occur in the crystal. Thus the ideal catalyst desired would be one of high surface area combined with having a large proportion of macropores so that this surface area which contains the active centers is available to the reaction materials. Thus, according to this theory, the crushing of much fewer of the macropores by extrusion accounts for part of the improved activity of the present catalyst. The additional activity advantage obtained by extruding "coarse" β alumina trihydrate rather than finer sized material can also be explained by visualizing additional desirable mechanical or super pores, between these coarse "particles" within the pellet. The coarse "particles" are the same "particles" identified in Fig. 4. These also are not crushed in extrusion to the extent suffered in pilling. This would account for the fact that no advantage in pilling operations is obtained when coarse particles are used. In any event, the present new catalyst is highly superior to previously known catalysts and no particular theory is relied upon to explain these advantages to confer patentability upon this invention.

Example VI

To 900 g. of β alumina trihydrate prepared from alcoholate alumina of the screen size shown in the Example I described as coarse alumina, was added a solution containing 67.5 cc. of H₂O and 83.7 cc. of 70% by weight commercial nitric acid. A wet, powdery material was so formed contained 14% of 100% HNO₃ based on Al₂O₃. This mass was mixed well by hand until a uniform looking material was obtained. These mixing steps took no longer than about 10 minutes to attain the desired mixed material. The material was then extruded in a California Pellet Mill, the dies being 1/16" in diameter and having a die thickness of 1/4" and sliced into rod lengths of 5/16". The thickness of the die determines the density of the extrudate obtained. Accordingly to protect macropores, as low a density as possible was obtained by the use of a die of minimum thickness commensurate with obtaining the necessary side crushing strength of the extrudate. The extrudate was then dried at about 160° F. for 30 minutes to remove surface water. It was then allowed to age for about 16 hours to evaporate moisture from the interior of the particles. It was then dried for 15 hours at 250° F. and the dried extrudates were calcined for 4 hours at 1100° F. After the extrudate cooled to room temperature, 396 g. of this extrudate were soaked 16 hours in 580 cc. of aqueous chloroplatinic acid solution containing 30.5 cc. of platinum stock solution. This stock solution contained 0.078 g. of platinum as platinum metal per cc. of solution. Excess solution was drained from the extrudate and the extrudate was then spread out on plates to air dry at ambient conditions for about 16 hours. The impregnated extrudate was then dried at 250° F. for 15 hours and calcined for one hour at 1100° F. It is noted that applicants prefer to put their soluble platinum compound, i.e. chloroplatinic acid, on the extrudate after pore structure has been previously developed by calcination. The finel catalyst contained 0.6% platinum and had a heat aged activity of 137.

Example VII 900 g. of the β alumina trihydrate described in Example VI were extruded as in Example VI but with 69 cc. of concentrated 37% by weight HCl acid and 18.4 cc. of concentrated 70% by weight HNO₃ and 61 cc. of H₂O. This amount of acid was equivalent to 8 wt. percent (based on 100% acids in a ratio of 7:4 HNO₃:HCl) acid on alumina. The material was mixed, extruded, dried and calcined and impregnated with platinum also as in Example VI. The final catalyst contained 0.3% platinum, was 3/32" in diameter x 5/16" in length, and had a heat aged activity of 128.

Example VIII

To 900 grams of beta alumina trihydrate prepared from alcoholate alumina as described in Example I, of the particle size described as "standard" alumina, was added 84.5 grams AlCl₃.6H₂O dissolved in enough water to give 176 cc. of total solution. The material was mixed, extruded, dried and calcined as described in Example VI. 496 grams of calcined extrudate were then impregnated with 695 cc. of an aqueous solution containing 3.7 grams of H₂PtCl₆.6H₂O. The impregnated extrudate was then dried and calcined as previously described. The finished catalyst contained 0.3% platinum and was 3/32" in diameter in lengths of 3/8" and had a heat aged activity of 131.

Example IX

To 900 grams of beta alumina trihydrate prepared from alcoholate alumina of the screen size described as "standard" alumina was added a solution containing 123 grams Al(NO₃)₃.9H₂O, said solution being made up with water to 151 cc. of total solution. The preparation of the extrudate ready for impregnation was carried out as described in Example VI. Impregnation of 426 grams of extrudate was carried out with 575 cc. of solution containing 3.2 grams of chloroplatinic acid. The final catalyst contained 0.3% platinum and the pellets were 3/32" in diameter x 3/8" in length. The heat aged activity of this catalyst was 92 and the amount of nitrate added was equivalent to that which would be obtained by adding 6% by weight of 100% HNO₃ based on Al₂O₃.

Example X

To 200 grams of a commercial beta alumina trihydrate prepared from alcoholate alumina screened through 20 mesh (thus obtaining a size distribution closely similar to that identified as "standard" previously described) was added a mixture of 24.6 cc. of HNO₃(70 wt. percent as HNO₃), and 12.5 cc. of glacial acetic acid made up to 60 cc. with added H₂O. This material after mixing was extruded through a cylinder and plunger laboratory extruder mounted in a Carver Press and the extruded material was then processed as described in Example VI with the exception that after 250° F. drying the extrudates were calcined 1 hour at 600° F. before calcining 4 hours at 1100° F. A number of batches of extrudate were prepared and 369 grams of the combined calcined material were impregnated by soaking overnight in 1 liter of solution containing 5.5 grams of H₂PtCl₆.6H₂O. The impregnated material was drained and air dried for seven hours, dried at 250° F. for 16 hours and finally calcined 1 hour at 1100° F. The final catalyst contained 0.6 platinum, the pellets were 1/8" in diameter by 3/8" in length and the fresh catalyst activity was 175. For this catalyst compared to other catalysts prepared by (a) the addition of 16% combined acids based on alumina or (b) the use of nitric acid alone, the advantage of using acetic acid is considerable. By using acetic acid the strength of the nitric acid can be reduced thus reducing corrosion. The acetic acid produces plasticity and the nitric acid produces macropores and strength. Other organic acids could probably also be used for this purpose.

Although the extruded catalyst base of the present invention has been found to be particularly advantageous when impregnated with platinum group metals and used in hydroforming, it is contemplated that this base may be advantageously used when composited with other known catalytic materials such as molybdenum oxide and used in hydroforming. It is also contemplated that this extruded catalyst base may be advantageously used when composited with other known catalytic materials such as chromium oxide and used in hydroforming. It is also contemplated that this extruded catalyst base may be advantageously used when composited with platinum group metals or with other catalytic metals such as chromium, vanadium, iron, nickel, and cobalt and used in hydrofining, aromatization, hydroisomerization, isomerization, hydrogenation, hydrocracking and oxidation. Particularly it is contemplated that the present extruded catalyst base may be advantageously impregnated with cobalt oxide and molybdenum oxide or cobalt molybdate and used in hydrofining.

It is also contemplated that the present extrusion technique can be used with aluminas containing minor amounts of surface stabilizers such as silica, zirconia, thoria, etc.

It should be noted that the extruded platinum catalyst of the present invention may be used both in fixed and moving bed type processes. It may also be adapted to be used in fluid bed hydroforming. In such fluid use the extruded pelets just before impregnation are pulverized and the powder is sized. The impregnation of this powder is then carried out as was described for the extruded catalyst. The catalyst so prepared would be expected to have both superior hardness and activity and selectivity characteristics as compared to unextruded eta alumina fluid type platinum hydroforming catalysts.

The specific names of the crystal modifications of alumina and the alumina hydrates now commonly accepted in the literature and used here are described in detail in an article by H. C. Stumpf et al. of the Aluminum Company of America, in Industrial and Engineering Chemistry, volume 42, page 1398, July 1950.

It is to be understood that this invention is not limited to the specific examples, which have been offered merely as illustrations, and that modifications may be made without departing from the spirit of the invention.

What is claimed is:

1. The method of preparing an improved extruded platinum group metal on alumina hydroforming catalyst which comprises the steps of: impregnating particles of hydrated alumina which is more than 50% in the beta alumina trihydrate form with 3.5–25%, based on alumina, of an aqueous solution of a compound selected from the group consisting of nitric acid, hydrochloric acid, mixtures of hydrochloric and nitric acids, mixtures of acetic acid and nitric acid, aluminum nitrate, and aluminum chloride; mixing the aqueous solution with the hydrated alumina for from 2 to 10 minutes; immediately thereafter subjecting the impregnated hydrated alumina to mechanical pressure to extrude $1/16$–$1/8''$ diameter rods; slicing these rods into separate extrudates in pellet form; drying at a temperature below 212° F. for a sufficient time to remove about 90% of the free water present within the extrudates; continuing drying at 250–600° F. for 1–24 hours; calcining at 1000–1450° F. for 1–24 hours to produce more than 5% eta alumina having preserved macropores; impregnating the high eta alumina extrudates with 0.01–4.0% of a compound of a platinum group metal; drying and calcining to produce a highly active and selective catalyst of side crushing strength resistance to 10 to 25 pounds on a single pellet.

2. The process of claim 1 in which the hydrated alumina is prepared by the hydrolysis of an alumina alcoholate.

3. The process of claim 1 in which the initial drying of the extrudates at a temperature below 212° F. is conducted by drying first at a temperature of about 160° F. for a period of less than 30 minutes to facilitate handling and prevent stickiness and then completing the air drying at room temperature for 8–24 hours.

4. The process of claim 1 in which the more than 50% eta alumina extrudates are impregnated with 0.1–2 wt. percent of platinum supplied as chloroplatinic acid.

5. The process of claim 2 in which the hydrated alumina is more than 80% beta alumina trihydrate and in which the calcined eta alumina extrudates are more than 80% eta alumina.

6. The method of preparing an improved extruded platinum group metal on alumina hydroforming catalyst which comprises the steps of: impregnating particles of hydrated alumina which is more than 50% in the beta alumina trihydrate form with 6–16%, based on alumina, of an aqueous solution of a compound selected from the group consisting of nitric acid, hydrochloric acid, mixtures of hydrochloric and nitric acids, mixtures of acetic acid and nitric acid, aluminum nitrate, and aluminum chloride; mixing the aqueous solution with the hydrated alumina for from 2 to 10 minutes; immediately thereafter subjecting the impregnated hydrated alumina to mechanical pressure to extrude $1/16$–$1/8''$ diameter rods; slicing these rods into separate pellet extrudates; drying at a temperature below 212° F. for a sufficient time to remove about 90% of the free water present within the extrudates; continuing drying at 250–600° F. for 1–24 hours; calcining at 1000–1450° F. for 1–24 hours to produce more than 50% eta alumina having preserved macropores; impregnating the high eta alumina extrudates with 0.01–4.0% of a compound of a platinum group metal; drying and calcining to produce a highly active and selective catalyst of side crushing strength resistance to 10 to 25 pounds on a single pellet.

7. The process of claim 4 in which the catalyst is additionally treated with 2 wt. percent based on catalyst of chlorine at 800°–1000° F.

8. The method of preparing an improved extruded platinum group metal on alumina hydroforming catalyst which comprises the steps of: grinding and sizing dried hydrated alumina which is more than 50% in the beta alumina trihydrate form to obtain coarse particles in a size range such that not more than 10% is retained on a 10 mesh screen and less than 15% passes through a 100 mesh screen, impregnating said coarse hydrated alumina particles with 3.5–25%, based on alumina, of an aqueous solution of a compound selected from the group consisting of nitric acid, hydrochloric acid, mixtures of hydrochloric and nitric acids, mixtures of acetic acid and nitric acid, aluminum nitrate, and aluminum chloride; mixing the aqueous solution with the hydrated alumina for from 2 to 10 minutes; immediately thereafter subjecting the impregnated hydrated alumina to mechanical pressure to extrude $1/16$–$1/8''$ diameter rods; slicing these rods into separate pellet extrudates; drying at a temperature below 212° F. for a sufficient time to remove about 90% of the free water present within the extrudates; continuing drying at 250–600° F. for 1–24 hours; calcining at 1000–1450° F. for 1–24 hours to produce more than 50% eta alumina having preserved macropores; impregnating the high eta alumina extrudates with 0.01–4.0% of a compound of a platinum group metal; drying and calcining to produce a highly active and selective catalyst of great strength resistance to 10 to 25 pounds on a single pellet.

9. The process of claim 8 in which the dried hydrated alumina is prepared by filtration followed by oven drying.

10. The process of claim 8 in which the dried hydrated alumina is prepared by the hydrolysis of an aluminum alcoholate.

11. The process of claim 8 in which the initial drying of the extrudates at a temperature below 212° F. is conducted by drying first at a temperature of about 160° F. for a period of less than 30 minutes to facilitate handling and prevent stickiness and then completing the air drying at room temperature for 8–24 hours.

12. The process of claim 8 in which the more than 50% eta alumina extrudates are impregnated with 0.1–2 wt. percent of platinum supplied as chloroplatinic acid.

13. The process of claim 8 in which the compound contained in the liquid extrusion aid is aluminum chloride and in which the percent contained based on alumina is 4–8%.

14. The process of claim 10 in which the dried hydrated alumina is more than 80% beta alumina trihydrate and in which the calcined eta alumina extrudates are more than 80% eta alumina.

15. The process of claim 12 in which the catalyst is additionally treated with 2 wt. percent based on catalyst of chlorine at 800–1000° F.

16. The method of preparing an improved extruded platinum group metal on alumina hydroforming catalyst which comprises the steps of: grinding and sizing dried hydrated alumina which is more than 50% in the beta alumina trihydrate form to obtain coarse particles in a size range such that not more than 10% is retained on a 10 mesh screen and less than 15% passes through a 100 mesh screen, impregnating said coarse hydrated alumina particles with 6–16%, based on alumina, of an aqueous solution of a compound selected from the group consisting of nitric acid, hydrochloric acid, mixtures of hydrochloric and nitric acids, mixtures of acetic acid and nitric acid, aluminum nitrate, and aluminum chloride; mixing the aqueous solution with the hydrated alumina for from 2 to 10 minutes; immediately thereafter subjecting the impregnated hydrated alumina to mechanical pressure to extrude $1/16$–$1/8''$ diameter rods; slicing these rods into separate pellet extrudates; drying at a temperature below 212° F. for a sufficient time to remove about 90% of the free water present within the extrudates; continuing drying at 250–600° F. for 1–24 hours; calcining at 1000–1450° F. for 1–24 hours to produce more than 50% eta alumina; impregnating the resulting high eta alumina extrudates having macropores with 0.01–4.0% of a compound of a platinum group metal; drying and calcining to produce a highly active and selective catalyst of side crushing strength resistance for 10 to 25 pounds on a single pellet.

17. The process of claim 16 in which the compound contained in the liquid extrusion aid is nitric acid in water.

18. The process of claim 16 in which the compound contained in the liquid extrusion aid is an aqueous mixture of hydrochloric and nitric acids supplied in the ratio of 7 parts of hydrochloric acid to 4 parts of nitric acid.

19. The process of claim 16 in which the compound contained in the liquid extrusion aid is an aqueous mixture of nitric acid and acetic acids supplied in the ratio of 1:1.

20. An improved extruded platinum on more than 50% eta alumina hydroforming catalyst having more than 25% of its total pore volume as macropores prepared by impregnating hydrated alumina which is more than 50% beta alumina trihydrate with 3.5–25%, based on alumina, of an aqueous solution of a compound selected from the group consisting of nitric acid, hydrochloric acid, mixtures of hydrochloric and nitric acids, mixtures of acetic acid and nitric acid, aluminum nitrate, and aluminum chloride, mixing the aqueous solution with the hydrated alumina for from 2 to 10 minutes; immediately thereafter subjecting the impregnated hydrated alumina to mechanical pressure to extrude $1/16$–$1/8''$ diameter rods; slicing these rods into separate extrudate pellets; drying at a temperature below 212° F. for a sufficient time to remove about 90% of the free water present; further drying; calcining; impregnating with chloroplatinic acid; drying and calcining, the strength of the pellets being sufficient to require 10 to 25 pounds on the side of a single pellet for crushing.

References Cited in the file of this patent

UNITED STATES PATENTS 2,809,170     Cornelius et al.           Oct. 8, 1957